Patented Nov. 22, 1932

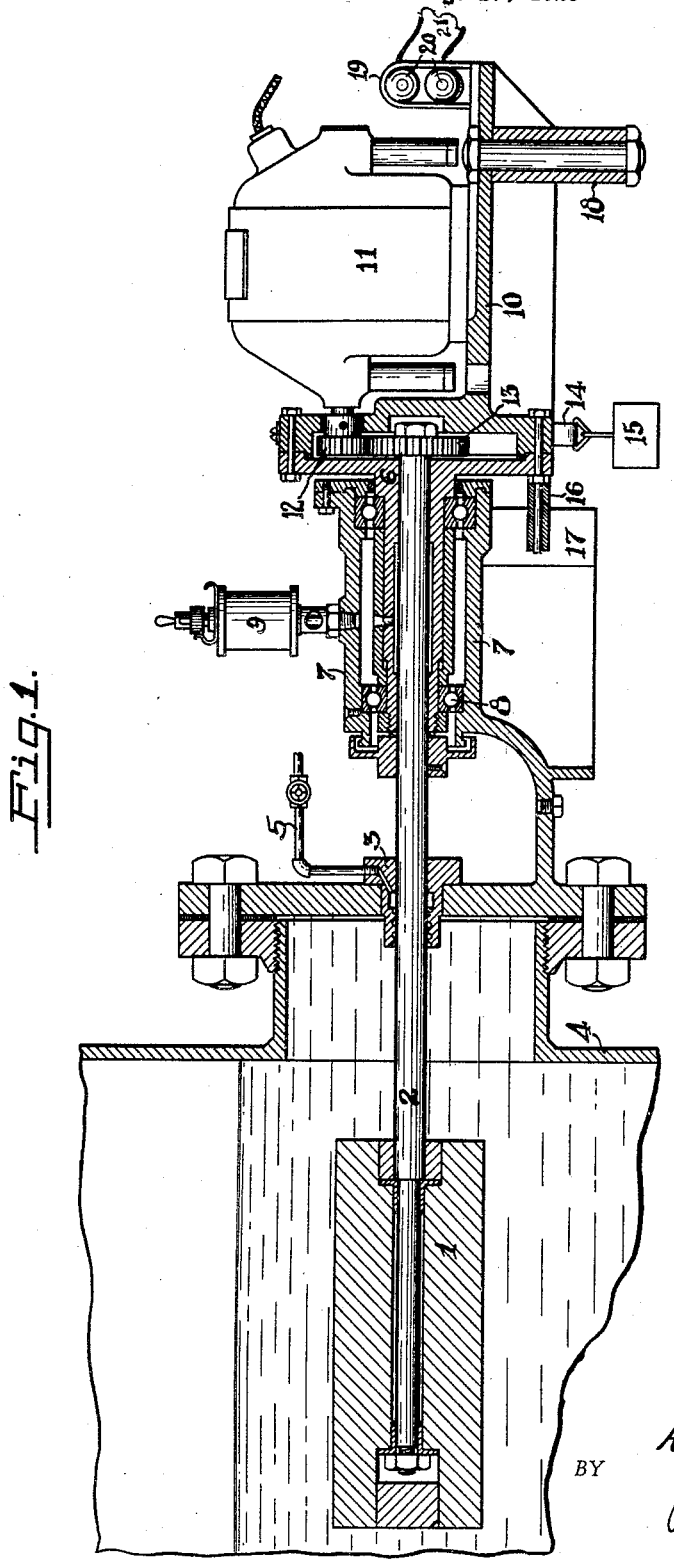

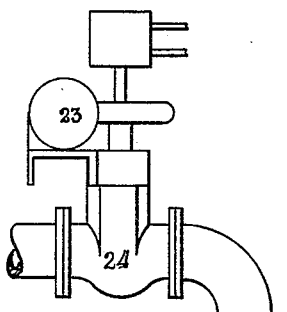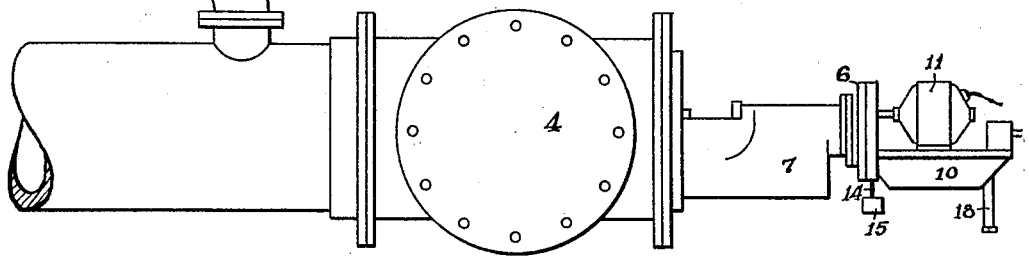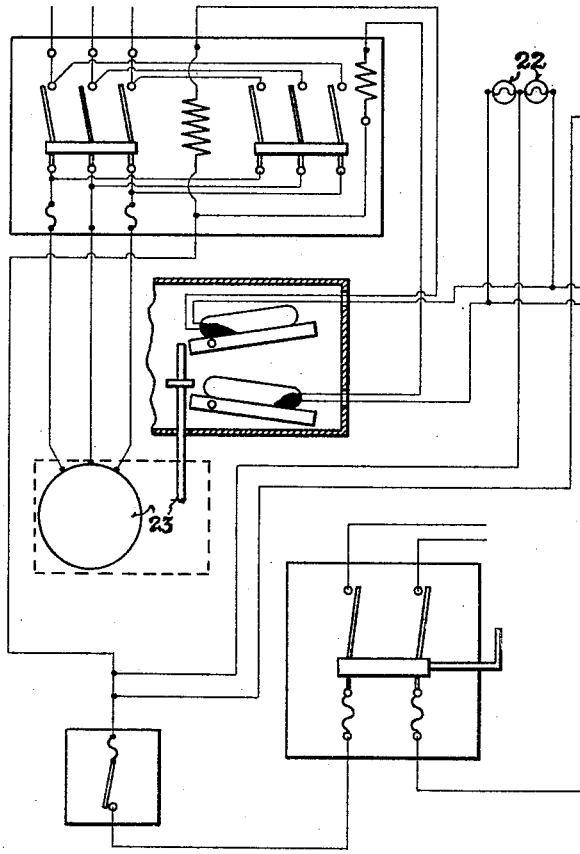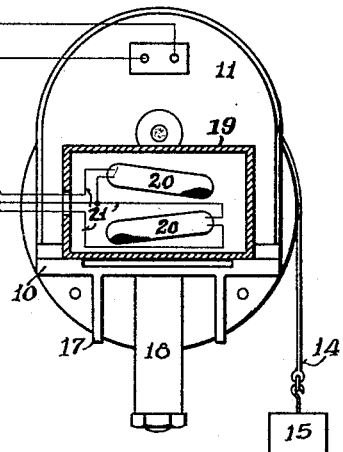

1,888,431

UNITED STATES PATENT OFFICE

ALAN OSBOURNE, OF SAN FRANCISCO, CALIFORNIA

METHOD AND APPARATUS FOR INDICATING AND REGULATING THE VISCOSITY OF MATERIALS

Application filed August 17, 1929. Serial No. 386,549.

This invention relates to an improved method for indicating and regulating the viscosity of materials.

My invention presents a distinct improvement over the methods and apparatus heretofore used to indicate and regulate the consistency or viscosity of materials. One of the most common methods heretofore practiced, employed instruments for measuring the resistance to the flow of viscous materials through tubes or the like. Other methods involved the rotating of agitators of various kinds in viscous materials and the measuring of the viscosity thereof through the use of instruments adapted to designate the work or energy required to drive the agitators. Both of these methods as well as the devices therein employed were more or less unsatisfactory for the reason that the specific gravity of the materials was measured along with their viscosity, that is to say, materials of high density and low viscosity might give the same reading as those of low density and high viscosity.

The reason that an agitator with arms or propeller blades measures specific gravity as well as viscosity, is that it moves portions of the liquid that have previously been at rest and will be at rest again after passing through the agitator. This liquid is accelerated, and the work required to accelerate a material is proportional to its density. In a tube viscometer the operating force is the gravity of the liquid, and will of course give varying readings depending on varying specific gravities, even though the liquid has the same viscosity.

One of the principal objects of my invention is to provide a novel method and improved apparatus for regulating the consistency or viscosity of materials.

Another object of my invention is to provide a novel method and improved apparatus for indicating the change of the viscosity of materials.

A still further object of my invention is to provide a novel method and improved apparatus for indicating the viscosity of materials.

Other objects more or less apparent will be specifically pointed out or will present themselves in the description to follow.

In the accompanying drawings:

Figure 1 is a vertical sectional view of an improved viscosity regulator constructed in accordance with my invention;

Figure 2 is a side view of the regulator showing the same applied to a suitable material carrier having a motor driven diluting valve connected thereto; and Figure 3 is a diagrammatic view showing in detail one form of electrical wiring employed with my improved viscosity regulator to control the flow of a diluting material into a viscous material.

Referring to the drawings the numeral 1 represents a cylindrical shaped member having a shaft 2 secured thereto which extends through a suitable packing gland 3 positioned in an opening in a side of a viscous material carrier or container 4. The packing gland 3 is so constructed as to provide an opening therein for the admittance into the container of a liquid carried by a pipe 5. The flow of the liquid through the packing gland tends to prevent any solid substance suspended in the viscous material, from gathering around the shaft at points where it projects through the gland and retarding or affecting its rotation. The shaft 2 rotatably extends through a quill 6 which is movably supported inside a stationary support 7. A plurality of ball bearings 8 interposed between the quill and the support serve to permit the quill to oscillate without undue friction. An oil-carrying cup 9 having means communicating with the inside of the stationary support 7, provides suitable quantities of oil to insure the proper lubrication of the contacting parts of the shaft, quill, support and ball bearings. The quill 6 is suitably secured, as by bolts to a cradle 10 having a constant speed motor 11 securely mounted thereon. The shaft of the motor is provided with a small gear 12 which meshes with a larger gear 13 secured to the shaft 2, thereby providing means for rotating the cylindrical member 1. The quill 6, the cradle 10 and the motor 11 being securely fastened together are adapted to oscillate through an arc as a unit. A flexible steel strap 14 fastened to the top point of the periphery of a flange provided on the cradle 10 and extending downwardly at the side of the said flange, carries a weight member 15 which may be varied to meet certain conditions. The weight member acts as a constant lever arm equal to the radius of the cradle flange, and it serves to properly balance the assembly comprising the quill, cradle and motor. This assembly, according to Newton's Law of Action and Reaction being equal and opposite in direction, tends to rotate on the ball bearings 8 in a direction opposite to the direction of rotation of the cylindrical member 1, and with a force equal to the torque required to turn the said member in the liquid material. The circular travel of the assembly is limited by a buffer 16 which is secured to the cradle 10 and positioned between two stop members 17 carried by the stationary support 7. Suspended from the underneath surface of the cradle 10 is a weight 18 which is so positioned with reference to the sides of the cradle as to properly assist in balancing the movable assembly. The motor 11 is so positioned on the cradle 10 that the center of gravity of the motor is above the center line or axis of the shaft 2, hence the torque exerted in rotating the cylindrical member 1 tends to overbalance the motor. This tendency is counterbalanced by means of the weight 18 which maintains the motor, cradle and quill in vertical positions when the motor is not operating.

Suitably positioned in a housing 19 mounted on the cradle 10 are two mercury switches 20 which are connected at opposite ends to flexible braided wires 21 leading to a source of power, to indicating lamps 22, and to a motor driven mechanism 23 which is adapted to actuate a motor driven valve 24 for regulating the flow of a diluting liquid into the container 4. These flexible braided wires are looped down with an amount of slack nearly equalling the distance between the cradle and the point at which these wires are firmly attached. This slack in the wires prevents their interfering with the oscillation of the quill, cradle and motor assembly. The mercury switches may also be connected to a mechanism for driving a pump or other apparatus adapted to deliver quantities of material to the container 4 for regulating the proper consistency of the material located therein, or they may be suitably connected to signalling apparatus which is adapted to give information as to whether the viscous material in container 4 is of the desired consistency. In as much as the electrical circuits connected to the mercury switches 20, the motor driven mechanism 23, the electric lamps 22, and the source of power are the usual type, I will not go into detail in describing the same. Suffice it to say that the change of position of the motor 11 and the cradle 10 actuates the mercury in the switches 20 to open and close the circuits leading to the motor driven apparatus 23, thereby causing the valve 24 to open or close to regulate the flow of a diluting liquid into the container 4.

When the viscosity of the material located in the container 4 is of the desired consistency, the weight member 15 so counteracts the torque required to turn the cylindrical member 1 in the said material that the motor and cradle are maintained in vertical positions. The weight member 15 may be varied at will to cause the motor and cradle to normally assume vertical positions depending, of course, upon the viscosity of the particular material located in the container 4. Should the material in the container for any reason, increase in viscosity and overcome the twisting movement of the weight member 15, the assembly, comprised of the motor, cradle and quill, swings through a small arc until the buffer 16 comes into contact with a stop member 17. The reverse motion takes place if the material in the container 4 again becomes of lower viscosity. Should the tilting of the motor 11 and cradle 10 be caused by the material becoming increasingly viscous, the mercury in one of the switches 20 moves in such a way as to close a circuit to the motor driven apparatus 23, thereby causing the valve 24 to open and allow a diluting fluid to enter the container and mix with the material therein. As soon as the material in the container again reaches a lower viscosity, the resistance thereof, to the cylindrical member 1 becomes less and the motor and cradle again move to upright positions, thereby causing the mercury switches 20 to open the circuits to the motor driven apparatus 23 and close the valve 24.

The moving of the motor, cradle and quill by the change in the viscosity of the material located in the container 4 permits the consistency of the said material to be automatically and accurately regulated.

The cylindrical member 1 having a smooth outer surface enables the rotation thereof without causing the surrounding viscous material to be unduly agitated. The particular shape of the cylindrical member with its smooth outer surface permits the viscosity of a material to be accurately regulated, principally because the centrifugal pump action is reduced to a minimum.

I have found that my improved regulator may be successfully used in determining and controlling the percentage of solids in a liquid by adjusting the weight member 15 so as to keep the motor and cradle in proper balance while the cylindrical member 1 is rotating in the liquid. The reason that the percentage of solids can be measured is because a suspension of finely divided solids in a liquid acts as though it had a viscosity of its own. Also my improved regulator may be successfully used in various ways to denote the change in consistency of liquids or their viscosity.

It is apparent that my improved viscosity regulator can be vertically positioned in a material container and operated with equal success as when positioned horizontally as herein shown.

It is apparent to those skilled in the art that my improved viscosity controller may be constructed in other forms equally as satisfactory as the one herein shown and described, so for this and other apparent reasons I desire my invention included broadly within the spirit of the appended claims.

Having described my invention what I claim is:

1. Means for regulating the consistency of liquids comprising a body immersible in a liquid, means for rotating the body, which means is adapted to be moved to different positions by the resistance of the liquid to the body, and electrically controlled means adapted to be actuated by the change of position of the first mentioned means for controlling the consistency of the liquid.

2. Means for regulating the consistency of liquids comprising a body immersible in a liquid, a motor pivotally mounted on a support, having a shaft connected to the body, and means actuated by the pivotal movement of the motor for controlling the consistency of the liquid.

3. Means for regulating the consistency of liquids comprising a cylindrical body immersible in a liquid, a motor pivotally mounted on a support, having a shaft connected to the body, and means actuated by the pivotal movement of the motor for controlling the consistency of the liquid.

4. Means for regulating the consistency of liquids comprising a cylindrical body having smooth outer surfaces at its sides, which body is immersible in a liquid, a motor pivotally mounted on a support, having a shaft connected to the body, and means actuated by the pivotal movement of the motor for controlling the consistency of the liquid.

5. Means for regulating the consistency of liquids comprising a body immersible in a liquid, having a shaft secured thereto, a stationary support through which the shaft extends, a motor pivotally mounted on the support and connected to the motor for balancing the motor, and means actuated by the pivotal movement of the motor for controlling the consistency of the liquid.

6. Means for regulating the consistency of liquids comprising a body immersible in a liquid, a motor pivotally mounted on a support and connected to the body, a variable weight member connected to the motor for normally counteracting the torque caused by the rotation by the motor of the body in the liquid, electrically controlled means associated with the motor and actuated by the latter's pivotal movement for regulating the consistency of the liquid.

7. Means for regulating the consistency of liquids comprising a body immersible in a liquid, a shaft secured to the body, a stationary support through which the shaft extends, a cradle pivotally mounted on the support, a motor mounted on the cradle having means connecting the same to the shaft, whereby the body may be rotated in the liquid, a weight member carried by the cradle for normally counteracting the torque caused by the rotation of the body in the liquid, and electrically controlled means actuated by the pivotal movement of the cradle and motor for regulating the consistency of the liquid.

8. Means for regulating the consistency of liquids comprising a body immersible in a liquid, having smooth outer surface which permits the body to rotate in the liquid without agitating the same, a motor pivotally mounted on a support having a shaft connected to the body, and electrically controlled means actuated by the pivotal movement of the motor for regulating the flow of a fluid into the liquid.

9. Means for regulating the consistency of liquids comprising a body having its outer surface free from irregularities, whereby a liquid into which the body is immersed will not be unduly agitated upon the rotation of the body, a motor connected to the body and mounted on a pivotal support, a weight member carried by the support for normally counteracting the torque required to rotate the body in the liquid, and electrically controlled means actuated by the pivotal movement of the motor and support for regulating the flow of a fluid into the liquid.

10. Means for regulating the consistency of liquids comprising a body immersible in a liquid, a shaft secured to the body, a stationary support through which the shaft extends, an assembly pivotally mounted on the support, which assembly includes a quill, a cradle and a motor, means connecting the motor and the shaft, whereby the shaft may be rotated by the motor, a variable weight member carried by the assembly for normally counteracting the torque required to rotate the body in the liquid, and electrically controlled means actuated by the pivotal movement of the assembly for regulating the flow of a diluting fluid into the liquid.

11. Means for regulating the consistency of liquids comprising a body having smooth and even outer surfaces which are adapted to reduce to a minimum the centrifugal pump action caused by the rotation of the body in a liquid, a shaft secured to the body, a motor mounted for pivotal movement, having means connecting the same to the shaft, and electrically controlled means actuated by the pivotal movement of the motor, for regulating the flow of a fluid into the liquid.

12. The method of regulating the consistency of liquids which consists in rotating a body in a liquid by means of a pivotally mounted motor and regulating the consistency of the liquid by the pivotal movement of the motor.

13. The method of regulating the consistency of liquids which consists in rotating a body in a liquid, causing the body to impart pivotal movement to the apparatus employed in rotating the body, and utilizing the pivotal movement of the apparatus to control the consistency of the liquid.

14. Means for regulating the consistency of liquids comprising a liquid container, a body immersible in a liquid located in the container, a shaft secured to the body, a motor connected to the shaft and pivotally mounted on a support, and weight members carried by the motor for balancing the motor, a fluid regulating valve connected to the container, and means actuated by the movement of the support for opening and closing the valve.

15. Means for regulating the consistency of liquids comprising a body immersible in a liquid, a motor having a shaft connected to the body, the motor being mounted on a pivotal support, a weight member carried by the support for balancing the support and motor and normally counteracting the torque required to rotate the body in the liquid, and means actuated by the pivotal movement of the motor and support for opening and closing a valve communicating with the liquid.

In testimony whereof I affix my signature.

ALAN OSBOURNE.